May 15, 1923.
W. E. SHARKEY
REDUCTION GEARING
Filed Oct. 10, 1921
1,455,360
2 Sheets-Sheet 1
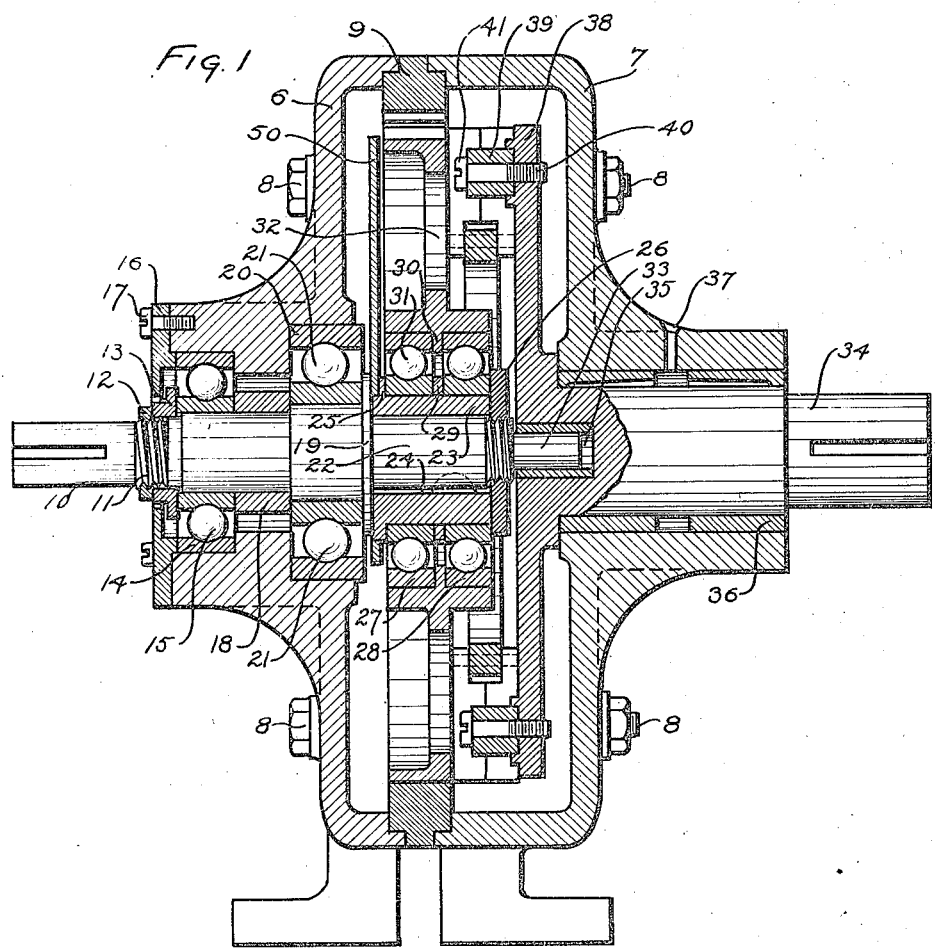
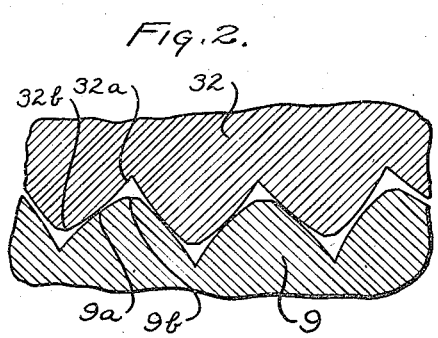
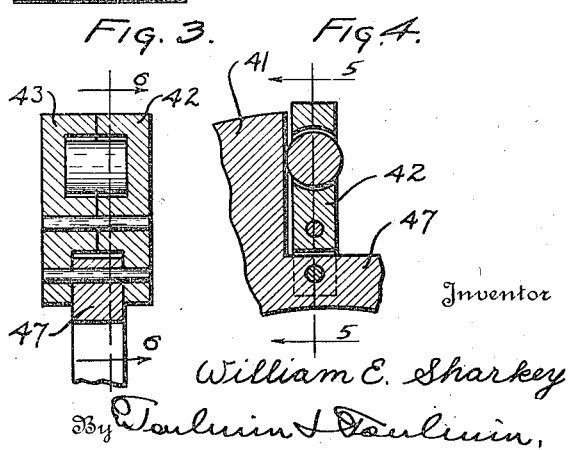
Inventor
William E. Sharkey
By Toulmin & Toulmin,
Attorney May 15, 1923.
W. E. SHARKEY
REDUCTION GEARING
Filed Oct. 10, 1921
1,455,360
2 Sheets-Sheet 2
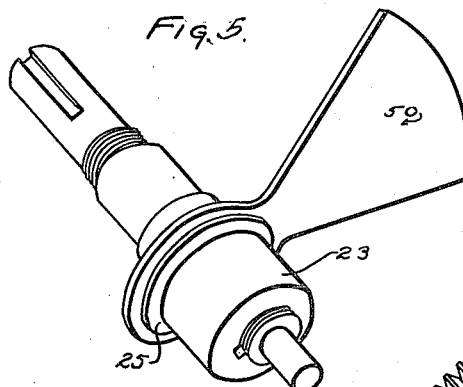
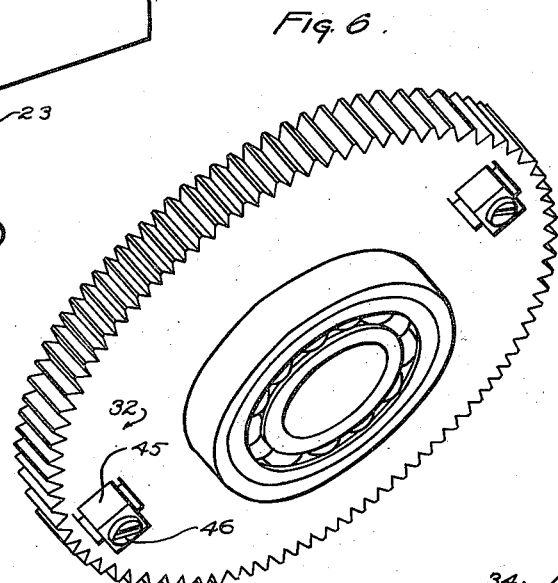
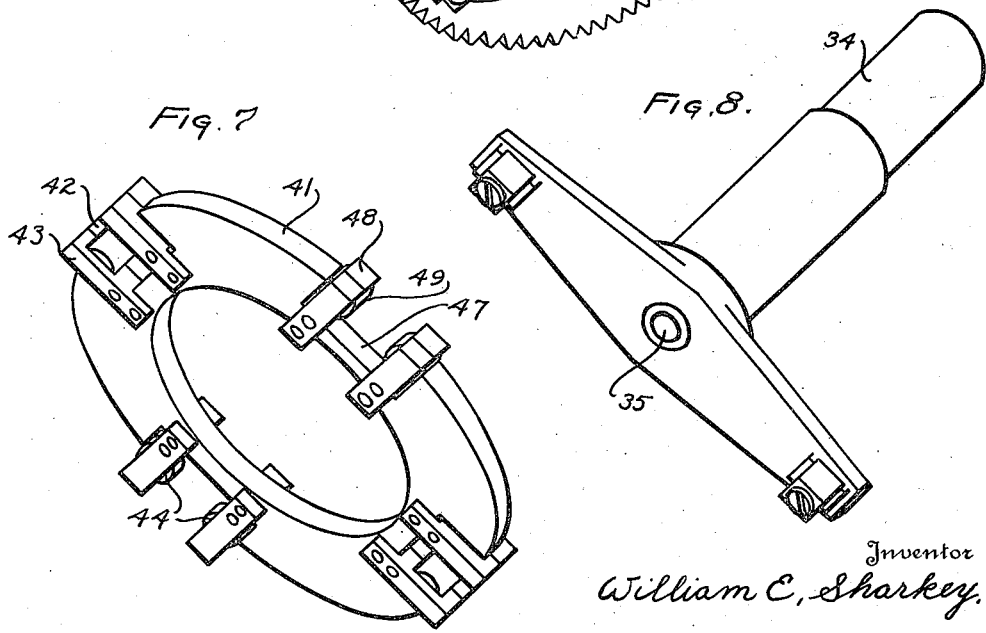
Inventor
William E. Sharkey.
By Toulmin & Toulmin,
Attorney Patented May 15, 1923.

1,455,360

UNITED STATES PATENT OFFICE.

WILLIAM E. SHARKEY, OF MIDDLETOWN, OHIO.

REDUCTION GEARING.

Application filed October 10, 1921. Serial No. 506,592.

*To all whom it may concern:*

Be it known that I, WILLIAM E. SHARKEY, a citizen of the United States, residing at Middletown, in the county of Butler and State of Ohio, have invented certain new and useful Improvements in Reduction Gearing, of which the following is a specification, reference being had therein to the accompanying drawing.

This invention relates to improvements in reduction gearing, and the object is to improve such gearing in the following particulars so as to produce an improved operation and greater efficiency in transmitting motion and power from a high speed driving shaft to a low speed driven shaft, from which latter the motion and power may be distributed or taken off for operating various machines which require much power applied at low speed.

The particulars in which my improvements reside are as follows:—

(1) In the peculiar connecting means between the driving and driven shafts.

(2) And in the provision of a number of features of detail, as will be hereinafter more fully set forth.

In the accompanying drawings:

Fig. 1 is a vertical median section taken axially through the reduction gearing;

Fig. 2 is an enlarged sectional view of portions of the external fixed gear and the internal rotatable gear showing the formation and relation of the teeth;

Fig. 3 is a detail sectional view showing the construction of a part of the transmission ring taken on the line 5—5 of Fig. 4;

Fig. 4 is a sectional view of the same parts taken on the line 6—6 of Fig. 3;

Fig. 5 is a detail perspective view of the driving shaft, the eccentric and the counterweight;

Fig. 6 is a perspective view on an enlarged scale of the inner or rotatable gear and parts of the ball bearing devices;

Fig. 7 is a perspective view and detail of the power transmission ring as a whole; and Fig. 8 is a perspective view of the driven shaft and its yoke.

The transmission gearing comprises a casing formed of two members 6 and 7 secured together by nuts and bolts 8 or in any other convenient manner and adapted to form an enclosure, as also bearings for the moving parts.

Between the two sections I secure an internally toothed gear wheel 9 in the nature of a ring with teeth on its interior circumference. This gear is fixed.

In the section 6 of the casing I mount the driving shaft 10 through ball bearings. To this end the shaft is threaded at 11 and provided with a nut 12 which binds a collar 13 in a manner to hold a pair of annuli 14 grooved to constitute races for bearing balls 15. A cap 16 secured by a screw 17 gives a finish and admits of inserting and retaining a lubricant. A spacing collar 18 on the shaft 10 and another spacing collar 19 on that shaft serve to retain two other annuli 20 grooved to form races for another set of bearing balls 21. In this way the driving shaft is finely mounted in respect of firmness, yet with little friction. On a portion 22 of this shaft I secure an eccentric 23, as by a key 24, so that when the shaft rotates, the eccentric travels with it. A flange 25 on the eccentric and a nut 26 on the shaft serve to confine two pairs of annuli 27 and 28. A spacing collar 29 on the eccentric and a flange 30 on the rotatable gear wheel presently to be mentioned serve also to aid in confining these annuli, all of which are grooved to receive the bearing balls 31.

In this manner I provide ball bearings between the eccentric 23 and the hub of the rotatable gear 32 which reduces the wear and therefore prevents lost motion. This rotating gear has teeth which mesh with those in the fixed gear 9. An extension 33 of the driving shaft 10 has a bearing in the head of the driven shaft 34, as seen at 35.

The instrumentalities so far described comprise the driving mechanism of my gearing. Before describing the driven devices I will refer to the character and operation of the peculiar teeth carried by the stationary and rotatable gears.

The teeth $9^a$ of the stationary gear are pyramidal and sheared off, as shown at $9^b$, to afford a space between the ends of the teeth $9^a$ and the angle $32^a$ of two adjacent teeth $32^b$ of the rotatable gear 32. Likewise, the ends of the teeth $32^b$ are sheared off to leave like spaces between them and the angle between two adjacent teeth $9^a$ of the gear 9.

The surfaces of the teeth $9^a$ are slightly convexed, and the surfaces of the teeth $32^b$ are also slightly convexed. This slight curvature enables the teeth, on entering and leaving to approach a true rolling contact and thus eliminate or reduce the friction incident to the sliding of flat surfaces one on the other. This convexity reduces friction between the teeth by thus affording a species of rolling contact. So while these teeth are generally of pyramidal form they have this slight convexity on their surfaces.

The effect is to enable the eccentrically-rotated teeth 32$^b$ to enter between the stationary teeth 9$^a$ and withdraw therefrom without binding or slipping or any other impediment as the gear 32 eccentrically rotates, though its teeth roll into and roll out of mesh with the stationary teeth. The entrance and withdrawal of the one set of teeth between the others is not the result of a radial movement alone of the movable gear, but of a radial movement plus a rolling movement, and it has developed in practice that by forming the teeth after the fashion here shown and described, this entrance and withdrawal of the radially moving rotatable teeth is smoothly and uniformly accomplished without any undue wear.

The driven shaft 34 has its bearing in the member 7 of the casing, but as the rotation of this shaft is slow a mere babbitt bearing 36 is sufficient with the provision for lubrication through the orifice 37. A power transmission yoke 38 is carried by the driven shaft and equipped with engaging blocks 39 held to the yoke by screws 40 and adapted to engage a motion transmission ring 41 by extending into notches 42. To reduce friction plates 43 are pivoted to the ring 41 and provided with antifriction rollers 44 with which the blocks 39 engage. In this manner the rotatable movement of this ring is transmitted through the yoke to the driven shaft 34.

In order to rotate the ring 41 the rotatable gear 32 is provided with engaging blocks 45 secured by screws 46 and adapted to enter notches 47 flanked by plates 48 pivoted to the ring and equipped with rollers 44 to reduce friction between the ring 41 and the engaging blocks 45 as the latter travel in an eccentric path, while the ring rotates essentially concentrically.

Referring to the counterbalance weight 50 it will be seen that it is mounted on and secured to the eccentric 23 and abutted against the flange 25. The weight is located diametrically opposite the major radius of the eccentric so as to counterbalance the excess of weight that prevails on that side of the center of the driving shaft, and counteract the centrifugal throw or force of the parts that lie generally on that side of the eccentric which is farthest from the center.

By this instrumentality, so located and connected with the eccentric, I find that my gearing operates without any tendency to jerk or vibrate due to any unequal centrifugal action. Any such inequality of action is eliminated.

Referring to Fig. 2 it will now be seen how the rotatable gear 32 is caused to rotate and move eccentrically so as to mesh with and roll around the internal gear 9. In the example illustrated in Fig. 2 there are 105 teeth in the stationary gear and 104 in the rotatable gear. This results in the rotatable gear rotating the space of one tooth for every revolution of the driving shaft, or in the complete rotation of the rotatable gear for every 104 revolutions of the driving shaft. As the driven shaft moves in unison with the rotatable gear it will be seen how the speed of the driven shaft is reduced as compared with the speed of the driving shaft and how the power exerted by the driven shaft is increased as compared with the power in the driving shaft.

My features of invention herein set forth improve the operation and smoothness of performance of the whole machine and have rendered it a mechanical as well as a commercial success.

Having thus fully described my invention, what I claim as new and desire to secure by Letters Patent, is:—

1. In a reduction gearing, the combination with a rotatable gear member having blocks thereon, of a power transmission ring having notches wherein said blocks are positioned, anti-friction rollers between the blocks and the sides of said notches, said ring also having other notches therein, a driven shaft having a yoke provided with engaging blocks positioned in the last mentioned notches, and anti-friction rollers between the last mentioned blocks and the sides of the last mentioned notches.

2. In a reduction gearing, the combination with a power transmission ring having peripheral notches, of plates secured to the ring and occupying the notches, and rollers mounted in the plates and projecting into the space formed by the notches.

3. In a device of the kind described, a power transmission ring having pairs of oppositely disposed notches extending inwardly from its periphery, a pair of plates for each of said notches arranged one at each side of the respective notch and having their inner ends straddling the ring and pivoted thereto each of said plates being provided with an opening therein, and rollers each journalled in the opening of a respective plate and projecting from the opposite faces of the plates.

4. In a device of the kind described, a power transmission ring having pairs of oppositely disposed notches extending inwardly from its periphery, a pair of plates for each of said notches arranged one at each side of the respective notch and having their inner ends straddling the ring and pivoted thereto each of said plates being provided with an opening therein, a driving member having a pair of blocks thereon fitting between the rollers of a respective pair of notches, and a driven member having a pair of blocks thereon fitting between the rollers of a second pair of notches, and rollers each journalled in the opening of a respective plate and projecting from the opposite faces of the plate.

In testimony whereof, I affix my signature.

WILLIAM E. SHARKEY.